United States Patent
Jackson et al.

(10) Patent No.: US 6,569,915 B1
(45) Date of Patent: May 27, 2003

(54) CROSSLINKED, HEAT SHRINKABLE POLYPROPYLENE COMPOSITIONS

(75) Inventors: Peter Jackson, Rexdale (CA); Marcus P. Heydrich, Rexdale (CA)

(73) Assignee: ShawCor Ltd., Toronto (CA)

( * ) Notice: Subject to any disclaimer, the term of this patent is extended or adjusted under 35 U.S.C. 154(b) by 0 days.

(21) Appl. No.: 09/705,954

(22) Filed: Nov. 6, 2000

(30) Foreign Application Priority Data

Oct. 16, 2000 (CA) ............................................. 2323307

(51) Int. Cl.$^7$ ........................... C08L 23/10; C08L 23/16
(52) U.S. Cl. ........................ 522/112; 525/70; 525/198; 525/240; 525/195; 525/191; 525/197
(58) Field of Search ........................... 522/112; 525/70, 525/193, 240, 95, 98, 191, 197; 264/232, 234, 236, 237

(56) References Cited

U.S. PATENT DOCUMENTS

| | | |
|---|---|---|
| 3,294,869 A | 12/1966 | Robinson |
| 3,717,559 A | 2/1973 | Oyama et al. |
| 4,277,578 A * | 7/1981 | Yoshimura et al. ......... 525/211 |
| 4,336,212 A | 6/1982 | Yoshimura et al. |
| 4,424,293 A | 1/1984 | Nojiri et al. |
| 4,520,260 A | 5/1985 | Kotian et al. |
| 4,628,073 A | 12/1986 | Fisher |
| 4,808,665 A | 2/1989 | Patel et al. |
| 4,916,198 A | 4/1990 | Scheve et al. |
| 5,047,446 A | 9/1991 | DeNicola, Jr. |
| 5,266,607 A | 11/1993 | Lucas et al. |
| 5,368,919 A | 11/1994 | Robeson |
| 5,414,027 A | 5/1995 | DeNicola, Jr. et al. |
| 5,439,949 A | 8/1995 | Lucas et al. |
| 5,508,318 A | 4/1996 | Comer |
| 5,541,236 A | 7/1996 | DeNicola, Jr. et al. |
| 5,552,104 A | 9/1996 | DeNicola, Jr. et al. |
| 5,554,668 A | 9/1996 | Scheve et al. |
| 5,820,981 A | 10/1998 | Williams et al. |
| 6,350,828 B1 * | 2/2002 | Takaoka et al. ......... 526/125.3 |
| 6,369,176 B1 * | 4/2002 | Laughner et al. ........... 526/114 |
| 6,380,294 B1 * | 4/2002 | Babinec et al. ............. 524/440 |

FOREIGN PATENT DOCUMENTS

| | | |
|---|---|---|
| WO | WO 95/34597 | 12/1995 |
| WO | WO 00/69930 | 11/2000 |

* cited by examiner

*Primary Examiner*—Jeffrey Mullis
(74) *Attorney, Agent, or Firm*—Ridout & Maybee LLP

(57) ABSTRACT

A heat-shrinkable article suitable for use as an insulating or coating material comprises a crosslinked composition of a polypropylene homopolymer or copolymer and an ethylene-propylene elastomer. The article is formed by a process comprising: i) creating a blend of the polypropylene homopolymer or copolymer and the ethylene-propylene elastomer by melt mixing; ii) melt processing the blend produced in i) to produce a melt processed material; iii) crosslinking the melt processed material produced in ii) by exposing it to radiation to produce a crosslinked material; iv) stretching the crosslinked material at a first temperature close to or above its softening or melting point and subsequently cooling it to a second temperature below its softening or melting point, to thereby freeze the crosslinked material in its stretched form. Subsequent heating of the article close to or above its softening point or crystalline melting point results in recovery of the pre-stretched dimensions of the article. Due to its relatively high content of polypropylene, the heat-shrinkable article thus produced has greater toughness and rigidity than polyethylene-based systems, making it suitable for use as insulation for wires and cables a heat-shrinkable corrosion resistant sleeves for high-temperature transmission pipeline joints, and for heat-shrinkable tubing or shapes for electrical insulation and mechanical protection.

21 Claims, No Drawings

CROSSLINKED, HEAT SHRINKABLE POLYPROPYLENE COMPOSITIONS

FIELD OF THE INVENTION

The present invention relates to polymeric compositions and their uses, and more particularly to crosslinked compositions of polypropylene with ethylene-propylene elastomers, and their uses as coating and insulating materials, particularly those that are heat-shrinkable, but not necessarily restricted thereto.

BACKGROUND TO THE INVENTION

Polypropylenes are ideally suited to the preparation of coatings and insulations designed for use at operating temperatures in excess of those that can be withstood by other polyolefins such as, for example, polyethylene, which exhibit lower softening and melting temperatures. Other attractive features are their high rigidity and toughness, low cost and relatively low density. Applications for these coatings and insulations would include polymeric insulation for electrical wires and cables, heat-shrinkable, corrosion protection sleeves for high-temperature transmission pipeline joints, heat-shrinkable tubing or shapes for electrical insulation and mechanical protection, or in applications requiring greater toughness and rigidity than is afforded by polyethylene-based systems. For example, heat-shrinkable sleeves used for the corrosion protection of high temperature pipeline joints are required to maintain dimensional stability and integrity at the operating temperature of the pipeline. Hence it is necessary to use a material, such as polypropylene, with a softening temperature or melting point high enough to prevent creeping or sagging of the sleeve from the pipe at the continuous operating temperature of the pipeline.

Also, in order to maximise thermal stability and physical properties, it is necessary to impart some thermoset characteristic to the material. This is done by crosslinking the polymer to some required degree. Crosslinking is also necessary for the production of heat-shrinkable articles in order to impart controlled shrinkage characteristics. The aim of this invention is to provide a means of preparing crosslinked, predominantly polypropylene-based, heat-shrinkable compositions, which can be used in the applications described, but not necessarily restricted thereto.

Polymers in which the predominant chain units comprise an alpha olefin, such as polypropylenes, are known to preferentially depolymerise or degrade when exposed to free radicals required to effect crosslinking. Hence, unlike similar materials, namely polyolefins such as polyethylenes and copolymers of polyethylene, it is not possible to crosslink polypropylene-based materials to satisfactory levels, as is required, for example, in the production of heat-shrinkable articles such as tubing, sheet, and moulded shapes, by using standard free-radical methods of crosslinking, such as electron beam irradiation, gamma irradiation, or peroxide-initiated crosslinking.

Work described in U.S. Pat. Nos. 3,717,559 and 4,424,293, for example, show that certain polypropylenes with the addition of acrylate crosslinking promoters can be crosslinked by irradiation to satisfactory levels for the production of polypropylene foam. However, the elastic strength and elongation of these materials at temperatures above the melting point have been found to be wholly insufficient to impart the high temperature resistance and controlled recovery characteristics required for the satisfactory production and performance of the heat-shrinkable products described above, and to confer the resistance to deformation and mechanical failure at elevated temperatures of electrical insulation, and similar, products. Hence it is necessary to resort to alternative methods to provide the necessary crosslinking of polypropylenes.

SUMMARY OF THE INVENTION

The present invention overcomes the above discussed problems of the prior art by providing a means whereby a predominantly polypropylene-based composition can be crosslinked by irradiation to the required level for the production of heat-shrinkable articles and functional high temperature insulation products by blending the polypropylene with a polymer that is highly sensitive to crosslinking by irradiation.

Hence, on crosslinking such a polymer blend, the radiation-sensitive component will preferably crosslink before the polypropylene can depolymerise to any great extent, and thereby form what may be termed as an interpenetrating crosslinked network with the predominantly uncrosslinked component. The crosslinking also acts to stabilise the blend through compatibilisation of the two relatively immiscible components by inducing a chemical interaction at the interface of the two components. As a result, the blend exhibits the properties of a crosslinked system whilst retaining the high temperature performance, stability and toughness of a predominantly polypropylene-based, semi-crystalline material. The crosslinked network allows the material to be heated close to or above the softening point without melting, such that it may be stretched a predetermined amount without rupture, and then frozen in the stretched state. Subsequent heating of the crosslinked, stretched material near or above the softening point will cause it to recover to approximately its original, unstretched dimensions.

In this invention, an ethylene-propylene elastomer, namely an ethylene-propylene copolymer (EPM) or, more preferably, an ethylene-propylene-diene terpolymer (EPDM), and, most preferably, an ethylene-propylene-diene terpolymer polymerised using metallocene catalysts (herein designated mEPDM), for example, the Nordel IP EPDM materials developed by DuPont Dow Elastomers L.L.C. using their INSITE® constrained-geometry catalyst technology, or a blend thereof, provides the necessary crosslinking sensitivity for blends with polypropylene.

The preferred mEPDM terpolymers, are prepared by copolymerising propylene with additional comonomers, specifically ethylene and a diene monomer usually chosen from 5-ethylidene-2-norbornene, dicyclopentadiene, or 1,4-hexadiene, using a highly stereospecific, single-site, constrained geometry, or so-called metallocene, catalyst. They differ substantially from existing EPDM materials produced using standard Ziegler Natta coordination catalysts in that it is possible to more accurately control the quantity and position of the comonomers within the polymer structure to provide a more precise molecular weight distribution and a more regular molecular architecture, resulting in higher crystallinity, for example, and superior material properties. More importantly with respect to the current invention, it is possible to adjust the comonomer levels for optimum sensitivity of the mEPDM to crosslinking by electron beam irradiation.

Suitable polypropylenes in this invention would include those materials commonly known in industry as polypropylene homopolymers, or polypropylene copolymers, the latter typically being copolymers of propylene and ethylene. Additionally, said polypropylene homopolymers include polypropylenes modified with reactive functional groups, such as acrylic acids, methacrylic acids, acrylates, methacrylates and anhydrides.

Alternatively, one or more additional materials may be incorporated to act as compatibilising or modifying agents for the ethylene-propylene elastomer and the polypropylene. Such materials would include the polypropylenes, EPM, EPDM and mEPDM materials described above; other ethylene-propylene elastomers; polyethylenes and copolymers of polyethylene, including those known in the industry as low density polyethylene, high density polyethylene, linear low density polyethylene, and those based on ethylene-butene, ethylene-hexene, ethylene-octene, ethylene-vinyl-acetate, ethylene-methyl-acrylate, ethylene-ethyl-acrylate, ethylene-butyl-acrylate, and similar materials, and particularly those prepared using metallocene catalysts; polyolefins modified with reactive functional groups, such as acrylic acids, methacrylic acids, acrylates, methacrylates and anhydrides; and block copolymers, such as styrene-butadiene, styrene-butadiene-styrene, styrene-ethylene/propylene and styrene-ethylene/butylene-styrene.

Blending of the polymeric, and any additional, constituents may be accomplished either in-situ with forming of the material during melt processing, or prior to forming, by melt mixing using a machine designed for that purpose, such as a continuous single or twin-screw compounder, kneader, or internal batch mixer.

The blended composition is formed into the desired article by melt processing techniques such as extrusion and moulding, including multi-layer processing, for example co-extrusion of the blend with another material to form discrete but intimately bonded layers. The article thus formed is then crosslinked by irradiation, for example with electron beam, gamma or ultra-violet radiation. The crosslinked article may be subsequently stretched at an elevated temperature and then frozen in the stretched state to create an article which can be recovered to its original unstretched dimensions on the application of sufficient heat. Examples of the aforementioned articles would include extruded tubing, sheet, and electrical insulation, and injection, compression or blow moulded insulating shapes, such as end caps and break-out boots, including heat-shrinkable versions of said examples.

Accordingly, in one aspect of the invention, a heat-shrinkable sheet is prepared by the process of: (a) melt blending a mixture of polypropylene copolymer with a metallocene-catalysed, ethylene-propylene diene terpolymer (mEPDM) and additional ingredients, such as radiation sensitizers, also known as crosslinking promoters, and antioxidant stabilisers, in a continuous compounder; (b) forming the pre-compounded material produced in (a) into a sheet by melt extrusion; (c) crosslinking the extruded sheet by subjecting it to radiation from an electron beam irradiator; (d) mechanically stretching the sheet at an elevated temperature; and (e) rapidly cooling the sheet whilst still in its stretched state.

In another aspect, the present invention provides a heat-shrinkable article comprising a crosslinked composition, said crosslinked composition comprising a polypropylene homopolymer or copolymer and an ethylene-propylene elastomer, said article being formed by a process comprising: i) creating a blend of the polypropylene homopolymer or copolymer and the ethylene-propylene elastomer by melt mixing; ii) melt processing the blend produced in i) to produce a melt processed material; iii) crosslinking the melt processed material produced in ii) by exposing it to radiation to produce a crosslinked material; iv) stretching the crosslinked material at a first temperature close to or above its softening or melting point and subsequently cooling it to a second temperature below its softening or melting point, to thereby freeze the crosslinked material in its stretched form.

DETAILED DESCRIPTION OF PREFERRED EMBODIMENTS

The crosslinking of polyolefins, in particular polyethylene and copolymers of polyethylene, by means of radiation, and in particular by electron beam and gamma radiation, is a well-known and established process for confering high temperature resistance and for the production of heat-shrinkable articles. However, the use of this technology to the crosslinking of polypropylene is stymied by the preference of the polypropylene to depolymerise or degrade through the process of molecular chain scission when subjected to the levels of radiation required to confer the aforementioned properties for practical applications other than minor chain extensions required for the stabilisation of foamed products. This problem has been overcome in the present invention by blending the predominantly radiation-uncrosslinkable polypropylene with a predominantly radiation-crosslinkable ethylene-propylene elastomer, preferably an ethylene-propylene diene terpolymer.

The polypropylene used in the present invention may be selected from any of the classes known as polypropylene homopolymers or copolymers, being preferentially isotactic in nature, with a melt viscosity preferably similar to the ethylene-propylene elastomer with which it is melt blended.

The polypropylene is preferably added to the blend in the amount from about 10 to 90 percent, more preferably from about 20 to 80 percent, and most preferably from about 40 to 60 percent by weight of the blend.

The ethylene-propylene elastomer used in the present invention may be chosen from the class of materials known as ethylene propylene copolymers or elastomers (EPM), more preferably from those known as ethylene-propylene diene terpolymers or elastomers (EPDM), and most preferably from those ethylene-propylene diene terpolymers or elastomers polymerised using single-site or metallocene catalysts (mEPDM), or blends thereof. The ethylene-propylene elastomer is preferably selected to have a similar melt viscosity as the polypropylene at the same temperature and under the same shear conditions required for processing the blend.

Preferably, the ethylene propylene elastomers comprise about 40 to 95% ethylene, more preferably about 70 to 95% ethylene, and most preferably about 85 to 95% ethylene. The ethylene-propylene-diene terpolymers additionally comprise about 0.5 to 10% diene monomer usually chosen from 5-ethylidene-2-norbornene, dicyclopentadiene, or 1,4-hexadiene, and preferably 5-ethylidene-2-norbornene.

The ethylene propylene elastomer is preferably added to the blend in the amount from about 10 to 90 percent, more preferably from about 20 to 80 percent, and most preferably from about 40 to 60 percent by weight of the blend.

The polypropylene is melt blended with the ethylene-propylene elastomer, and, optionally, with one or more of a number of ingredients such as radiation sensitizers or crosslinking promoters, compatibilisers, pigmenting agents, antioxidants, heat stabilisers, uv stabilisers, mineral fillers, process aids and the like, to form a composition according to the invention.

The compatibiliser may be selected from one or more of the polypropylenes, EPM, EPDM and mEPDM materials described above; other ethylene-propylene elastomers; polyethylenes and copolymers of polyethylene, including those known in the industry as low density polyethylene, high density polyethylene, linear low density polyethylene, and those based on ethylene-butene, ethylene-hexene, ethylene-octene, ethylene-vinyl-acetate, ethylene-methyl-acrylate, ethylene-ethyl-acrylate, ethylene-butyl-acrylate, and similar materials, and particularly those prepared using metallocene catalysts; polyolefins modified with reactive functional groups, such as acrylic acids, methacrylic acids, acrylates, methacrylates, and anhydrides; and block copolymers, such as styrene-butadiene, styrene-butadiene-styrene, styrene-ethylene/propylene and styrene-ethylene/butylene-styrene.

The function of the compatibiliser is to promote the miscibility of the polypropylene and ethylene-propylene elastomer when they are blended together. The compatibiliser is preferably added in the amount from about 1 to 50% and most preferably from about 5 to 10% by weight of the blend. Addition of a compatibiliser will not be necessary where the polypropylene and ethylene-propylene elastomer exhibit satisfactory natural miscibility.

The radiation sensitizer or crosslinking promoter, if required, may be preferably selected from the family of multifunctional acrylate or methacrylate monomers typically used as crosslink promoters for polyolefin-based polymers. Preferred monomers would include trimethylol propane triacrylate, trimethylol propane trimethacrylate and tetramethylol tetraacrylate. The radiation sensitizer would be added in the amount from about 0.25 to 2.5%, and preferably 0.5 to 1.5% by weight of the blend. The function of the radiation sensitizer is to render the polymer composition more susceptible to crosslinking by electron beam (beta), or gamma radiation, hence allowing a given level of crosslinking to be achieved with less radiation dosage and energy than if a sensitizer were not used. Addition of the crosslinking promoter will not be necessary if the polymer blend by itself is sufficiently sensitive to irradiation to achieve the required degree of crosslinking.

The antioxidant stabiliser may be chosen from any suitable antioxidant or blend of antioxidants designed to prevent degradation of the polypropylene-based blend during melt processing and subsequent heat aging of the final product. Examples of suitable antioxidant and process stabilisers would include those classes of chemicals known as hindered phenol antioxidants and phosphite stabilisers. These would typically be added in an amount from about 0.1 to 5% by weight of the blend depending upon the aging properties required and the type and quantity of additional destabilising ingredients in the composition, for example halogenated flame retardants or mineral fillers. It should also be noted that these antioxidants, if added in sufficient amounts, will act as "radiation scavengers," reducing the effectiveness of the radiation to induce the desired crosslinking reaction and tending to reduce degree of crosslinking obtainable for a given radiation dosage.

The above constituents of the blend may be melt blended either in-situ with forming of the final product during melt processing, or prior to forming by melt mixing using a machine designed specifically for that purpose, such as a continuous twin-screw compounder, kneader, or internal batch mixer.

A particularly preferred process for preparing a radiation-crosslinkable polypropylene based article is described below:

A polypropylene copolymer and a mEPDM elastomer along with a radiation sensitizer, antioxidant stabiliser and pigmenting agent, are melt blended in a Buss reciprocating-screw kneader, continuous compounder, at a temperature above the melting point of the composition, to form a fully dispersed compound which is then pelletized and stored for subsequent processing.

The pelletized compound is then melt processed, for example extruded, co-extruded, or moulded, to the desired article. The article so produced is then crosslinked by subjecting it to electron beam radiation of approximate dosage between 1 and 15 megarads in an electron beam accelerator, for example a "Dynamitron" manufactured by Radiation Dynamics Inc. The dosage used is dependent upon the final properties of the article required. Too low a dosage will result in the article having a low degree of crosslinking, poor mechanical toughness and a tendency to prematurely soften or melt at elevated temperatures. Too high a dosage may result in degradation of the polypropylene component with a resultant unacceptable deterioration in mechanical properties. A preferred dosage has been found to be around 5 megarads for the manufacture of heat-shrinkable articles.

The article thus produced exhibits the property of softening but not melting when re-heated above its softening point or crystalline melting point. This is desirable for the manufacture of heat-shrinkable articles, since the polymer may be stretched beyond the original extruded or moulded dimensions without rupture using relatively low forces, and can then be frozen in the stretched state by cooling it rapidly to below the softening or melting point. Stretching can be accomplished by mechanical, pneumatic or hydraulic means. At this point the stretched crosslinks are held in a stable state by the re-formed, solid crystalline regions of the polymeric components. Subsequent re-heating of the stretched article above the melting point will cause the crystalline regions to re-melt and the structure to revert to its original extruded or moulded dimensions. The crosslinking also prevents the article from becoming liquid during this shrinking process.

The invention is further illustrated by the following examples:

EXAMPLE 1

A polypropylene copolymer of density 0.90 g/cm$^3$ and melt flow index 0.45 dg/min, (Profax 7823 from Montell Polyolefins), and a mEPDM terpolymer of density 0.921, Mooney Viscosity 10 (at 125° C.), ethylene content 90% and ethylidene norbornene content 4.9% (Nordel IP 4920 from DuPont Dow Elastomers), are melt blended with a trimelthylol propane triacrylate crosslinking promoter, (SR-351 from Sartomer Co.), and a blend of hindered phenol and phosphite stabilisers, (Irganox B225 from Ciba Speciality Chemicals) in the amounts shown in Table 1 using a Buss Kneader, reciprocating screw, continuous compounder at a temperature of around 180° C., the dispersed blend then being fed through a hot die-face pelletizer and dryer attachment.

TABLE 1

| Radiation Crosslinkable Polypropylene Material | |
|---|---|
| Ingredient | Weight |
| Polypropylene | 60 |
| mEPDM | 40 |
| Crosslinking Promoter* | 4 |
| Antioxidant** | 3.3 |

*Added as a 50% masterbatch in polyethylene
**Added as a 15% masterbatch in polyethylene

EXAMPLE 2

In an additional example, the composition is prepared as in Example 1 except that the crosslinking promoter is not included in the formulation.

EXAMPLE 3

In a further example, the composition is prepared as in Example 1 except that the mEPDM terpolymer was replaced by a standard EPDM terpolymer of density 0.87g/cm$^3$, Mooney Viscosity 50 (at 125° C.), ethylene content 75% and ethylidene norbornene content 4.5% (Royalene IM7200 from Uniroyal Chemical Co.).

EXAMPLE 4

This example describes the production of a crosslinked, extruded, heat-shrinkable sheet according to the present invention.

The compounded pellets produced according to Example 1, 2 or 3 were fed through a 24:1 L/D single-screw extruder equipped with a single layer sheet die at a melt temperature of approximately 200° C. The sheet was fixed to the required dimensions of width, thickness and orientation by passing it through a cooled, 3-roll calendering stack, and then wound onto reels. Additionally, the sheet may be co-extruded with a second material of similar or disimilar composition such to create a laminate structure with each layer having different functional properties, for example an adhesive-coated, polypropylene sheet.

The sheet was then crosslinked at a dosage of approximately 5 megarads using a Radiation Dynamics "Dynamitron" electron beam accelerator, and was then tested to determine the degree of crosslinking achieved and for the mechanical properties indicated in Table 2. For the composition described in Example 1, the results in Table 2 also illustrate the effect of different radiation dosages on the properties of the sheet.

The crosslinked sheet was then re-heated to a temperature close to or above the softening point or melting point of the composition, and then stretched using either a machine-direction or a transverse-direction mechanical stretcher. Whilst in the stretched state, the sheet was rapidly cooled using air, water or another suitable medium to below the softening or crystalline melting point of the composition to fix the sheet at the stretched dimensions. The sheet, either prior to after stretching, may be extrusion laminated or coated with an additional layer of material having different functional properties, such as a heat-activated adhesive.

TABLE 2

Test results For Crosslinked Sheet

| Property | Property Value at Specific Radiation Dosage | | | | |
|---|---|---|---|---|---|
| | Example 1 | | | | Example 2 |
| Dosage (Mrad) | 0 | 5.3 | 9.5 | 13.3 | 5.3 |
| Gel Fraction (% degree of crosslinking) | 0 | 67 | 63 | 62 | 50 |
| Hot Tensile Strength @ 200° C. and 100% Elongation (psi) | 0.5 | 50 | 68 | 70 | 41 |
| Ultimate Hot Elongation @ 200° C. (%) | 170 | 230 | 150 | 150 | 360 |
| Ultimate Tensile Strength @ 23° C. (psi) | 5400 | 4700 | 5000 | 4400 | 5500 |
| Ultimate Elongation @ 23° C. | 700 | 490 | 480 | 440 | 560 |
| Flexural Modulus (psi) | 30000 | 42000 | 62000 | 50000 | 40000 |

EXAMPLE 5

A heat-shrinkable tubing product was made by extruding the composition in Example 1, 2 or 3 into a tubular cross-section, irradiating the extruded tube with an electron beam to a dosage of approximately 5 megarad, heating the thus crosslinked tube to a temperature close to or above the softening point or melting point of the composition, stretching the heated tube by mechanical or pneumatic means whilst at this temperature, and then finally rapidly cooling the tube with air or water to below the softening point or crystalline melting point whilst maintaining the tubing in the stretched state.

Although the invention has been described in relation to certain preferred embodiments, it will be appreciated that it is not intended to be limited thereto. Rather, the invention is intended to encompass all embodiments which fall within the scope of the following claims.

What is claimed is:

1. A heat-shrinkable article comprising a crosslinked, predominantly polypropylene-based composition, said crosslinked composition comprising a polypropylene homopolymer or copolymer and an ethylene-propylene elastomer, wherein the polypropylene homopolymer or copolymer is comprised predominantly of propylene chain units, said article being formed by a process comprising:

i) creating a blend by melt mixing the polypropylene homopolymer or copolymer and the ethylene-propylene elastomer;

ii) melt processing the blend produced in i) to produce a melt processed material;

iii) crosslinking the melt processed material produced in ii) by exposing it to radiation to produce a crosslinked, thermoset material; and iv) stretching the crosslinked material at a first temperature at or above its softening point and subsequently cooling it to a second temperature below its softening point, to thereby freeze the crosslinked material in its stretched form.

2. The heat shrinkable article according to claim 1, wherein said polypropylene copolymer comprises a copolymer of propylene and ethylene.

3. The heat shrinkable article according to claim 1, wherein said polypropylene homopolymer or copolymer is functionalized with one or more reactive functional groups selected from the group consisting of acrylic acids, methacrylic acids, acrylates, methacrylates and anhydrides.

4. The heat shrinkable article according to claim 1, wherein the ethylene-propylene elastomer is selected from one or more members of the group consisting of ethylene-propylene copolymers and ethylene-propylene-diene terpolymers.

5. The heat shrinkable article according to claim 4, wherein the ethylene-propylene elastomer is an ethylene-propylene-diene terpolymer polymerized using a metallocene catalyst.

6. The heat shrinkable article according to claim 5, wherein the ethylene-propylene-diene terpolymer is prepared by copolymerizing propylene with ethylene and a diene monomer selected from the group consisting of ethylidene-2-norbornene, dicyclopentadiene and 1,4-hexadiene.

7. The heat shrinkable article according to claim 5, wherein the metallocene catalyst comprises a stereospecific, single-site, constrained geometry metallocene catalyst.

8. The heat shrinkable article according to claim 4, wherein the ethylene-propylene-diene terpolymers comprise from about 40 to about 95 percent by weight ethylene and from about 0.5 to about 10 percent by weight diene monomer.

9. The heat shrinkable article according to claim 1, wherein the polypropylene homopolymer or copolymer comprises up to about 90 percent by weight of the blend produced in i).

10. The heat shrinkable article according to claim 9, wherein the polypropylene homopolymer or copolymer comprises from about 60 to about 90 percent by weight of the blend produced in i).

11. The heat shrinkable article according to claim 1, wherein the ethylene-propylene elastomer comprises from about 40 to about 95 percent by weight ethylene.

12. The heat shrinkable article according to claim 11, wherein the ethylene-propylene elastomer comprises from about 85 to about 95 percent by weight ethylene.

13. The heat shrinkable article according to claim 1 wherein, in step i), the polypropylene homopolymer or copolymer and the ethylene-propylene elastomer are blended with one or more additional ingredients selected from the group consisting of radiation sensitizers, crosslinking promoters, compatibilizers, pigmenting agents, antioxidants, heat stabilizers, UV stabilizers, mineral fillers and process aids.

14. The heat shrinkable article according to claim 13, wherein the compatibilizer is selected from the group consisting of ethylene-propylene copolymers, ethylene-propylene-diene terpolymers, polyethylene and copolymers of polyethylene.

15. The heat shrinkable article according to claim 14, wherein the compatibilizer comprises from about 5 to about 10 percent of the blend produced in i).

16. The heat shrinkable article according to claim 14, wherein the compatibilizer is selected from polyethylenes selected from the group consisting of low density polyethylene, high density polyethylene and linear low density polyethylene; polyethylene copolymers based on ethylene-butene, ethylene-hexene, ethylene-octene, ethylene-vinyl-acetate, ethylene-methyl-acrylate, ethylene-ethyl-acrylate, ethylene-butyl-acrylate, prepared using metallocene catalysts; polyolefins modified with reactive functional groups, selected from the group consisting of acrylic acids, methacrylic acids, acrylates, methacrylates and anhydrides; and block copolymers selected from the group consisting of styrene-butadiene, styrene-butadiene-styrene, styrene-ethylene/propylene and styrene-ethylene/butylene-styrene.

17. The heat shrinkable article according to claim 1, wherein said steps i) and ii) are performed simultaneously.

18. The heat shrinkable article according to claim 1, wherein said step i) is performed prior to step ii) using a machine selected from the group consisting of a continuous twin-screw compounder, a kneader and an internal mixer.

19. A heat shrinkable article comprising a crosslinked, predominantly polypropylene-based composition, said crosslinked composition comprising a polypropylene homopolymer or copolymer and an ethylene-propylene elastomer, wherein the polypropylene homopolymer or copolymer is comprised predominantly of propylene chain units, said article being formed by a process comprising:

i) creating a blend by melt mixing the polypropylene homopolymer or copolymer and the ethylene-propylene elastomer;

(ii) melt processing the blend produced in i) to produce a melt processed material;

iii) crosslinking the melt processed material produced in ii) by exposing it to radiation to produce a crosslinked material, wherein a dosage of said radiation is selected such that the crosslinked material exhibits softening but not melting when it is heated above its softening point; and iv) stretching the crosslinked material at a first temperature at or above its softening point and subsequently cooling it to a second temperature below its softening point, to thereby freeze the crosslinked material in its stretched form.

20. The heat shrinkable article according to claim 19, wherein the dosage of electron beam radiation is about 5 megarads.

21. The heat shrinkable article according to claim 19, wherein said crosslinking step iii) is performed in an electron beam accelerator, the radiation comprises electron beam radiation and the dosage is from about 1 to about 15 megarads.

\* \* \* \* \*